United States Patent [19]
Greene

[11] 3,930,691
[45] Jan. 6, 1976

[54] SWING PAD BEARING

[76] Inventor: Jerome Greene, 1608 Comanche Road, Arnold, Md. 21012

[22] Filed: Apr. 12, 1974

[21] Appl. No.: 460,658

[52] U.S. Cl. ............... 308/160; 308/9; 308/72; 308/73; 308/121
[51] Int. Cl.² ............... F16C 7/04; F16C 17/03; F16C 17/06; F16C 27/06
[58] Field of Search .......... 308/160, 9, 72, 73, 121, 308/122, 135, 168

[56] References Cited
UNITED STATES PATENTS

| | | | |
|---|---|---|---|
| 1,117,506 | 11/1914 | Kingsbury | 308/160 |
| 1,173,369 | 2/1916 | Moore | 308/160 |
| 1,293,471 | 2/1919 | Kingsbury | 308/160 |
| 1,331,108 | 2/1920 | Howarth | 308/160 |
| 1,684,693 | 9/1928 | Bohm | 308/160 |
| 1,825,519 | 9/1931 | Gordon | 308/160 |
| 2,362,667 | 11/1944 | Schmidt | 308/160 |
| 2,424,028 | 7/1947 | Haeberlein | 308/160 X |
| 2,577,798 | 12/1951 | Neubauer | 308/160 |
| 2,621,090 | 12/1952 | Lakey | 308/160 |
| 2,691,556 | 10/1954 | Lakey | 308/168 |
| 2,744,799 | 5/1956 | Howarth | 308/160 |
| 2,955,003 | 10/1960 | Sheppard | 308/160 |
| 3,011,839 | 12/1961 | Gruber | 308/160 |
| 3,398,996 | 8/1968 | Wucherer | 308/9 X |
| 3,398,997 | 8/1968 | Wucherer | 308/9 X |
| 3,495,886 | 2/1970 | Roberts et al. | 308/135 |
| 3,635,534 | 1/1972 | Barnett | 308/121 |

FOREIGN PATENTS OR APPLICATIONS

| | | | |
|---|---|---|---|
| 420,847 | 11/1925 | Germany | 308/160 |
| 868,087 | 2/1953 | Germany | 308/160 |
| 1,075,140 | 7/1967 | United Kingdom | 308/160 |

*Primary Examiner*—Lloyd L. King
*Assistant Examiner*—Howard Beltran
*Attorney, Agent, or Firm*—R. S. Sciascia; Q. E. Hodges

[57] ABSTRACT

A novel pad-type fluid wedge sliding surface bearing in which the individual pads have a swing-like motion to produce a lubricating wedge between the face of the pad and the moving surface. The center of swing for each pad is located so that the fluid friction moments and the pressure moments on the pads oppose each other. The moment equilibrium position of the pads will form a wedge converging in the direction of motion of the moving member. In achieving this condition, the pads may be constructed of a metal-elastomer laminate section with the laminal arcuately formed about a center located in the direction of the opposing sliding surface.

16 Claims, 6 Drawing Figures

SWING PAD BEARING

The invention described herein may be manufactured and used by or for the Government of the United States of America for governmental purposes without the payment of any royalties thereon or therefor.

BACKGROUND OF THE INVENTION

In the construction of conventional fixed geometry bearings of the fluid-wedge sliding surface type, the effects of loading on the surface is to reduce the fluid wedge thickness. This restricts replenishment of the lubricant.

In pivoting pad sliding surface bearings, the effects of loading on the surface of the pads and the lubricant viscous friction cause the fluid wedge of the lubricant to diverge in the direction of the movement of the rotating member with the result that the leading edge of the wedge tends to close and restrict this replenishment of the lubricant. This results from the direction of forces on the pads. This tendancy is reduced by the deformability of the pads under operating conditions. The result is bearings of limited load carrying capacity and with a limited ability to maintain a lubricant wedge thereby to prevent an operating condition known as "stick-slip."

SUMMARY OF THE INVENTION

The bearing of the present invention is of the pad-type, fluid wedge, sliding surface type. The individual pads, in a preferred embodiment, are characterized by having a metal-elastomer laminated structure which is arcuately curved with the center of curvature of the arc being in the direction of the opposing member of the bearing. The result of this location of the center of curvature of the pad is that under the forces of friction and the pressure of the load, the pads swing so as to produce a wedge converging in the direction of movement of the moving member. Motion of the pads is usually very slight, the wedge angle being minute, and the face of the pad remains substantially parallel to the surface of the rotating load member when the pad is mounted on the stationary member. Such a parallelism arrangement provides for a maximum-load carrying capacity and prevents "stick-slip." The bearing of the present construction is inherently capable of accommodating to rotation of the load member in either direction and can be designed either as a flat thrust bearing, a cylindrical bearing or a combination of the thrust and cylindrical bearing.

OBJECTS OF THE INVENTION

It is an object of this invention to produce a bearing having a high load capacity.

Another objective is to produce a bearing having substantially no "stick-slip."

Another object of this invention is to provide a bearing having a low start-up friction component regardless of the magnitude of load applied before start of rotation.

Other objects and the attendant advantages of the bearing of the present invention will become more apparent when considered in connection with the accompanying drawings.

DESCRIPTION OF THE DRAWING

Referring now to the drawings, wherein like reference characters designate like or corresponding parts throughout the several views, FIG. 1 shows a portion of a conventional pivoted pad bearing having a pad 11 that can pivot on pivot 12 and a moving member 13 which moves in the direction of arrow 14. The movement of member 13 relative to member 11 shears the fluid between the members and generates the viscous frictional force indicated by arrow F. The center of load pressure of this particular pad 11 vector of the bearing is indicated by vector arrow P. The moments of these two forces about the pivot point of the pad 11 are respectively $Pa$ and $Fb$, where $a$ and $b$ are respectively the displacements of the friction and pressure force vectors F and P from the pivot point. Under the conditions illustrated both these moments tend to pivot the pad about its pivot in a direction to close the wedge on the up stream side of the pad as shown in dotted lines. This in turn tends to cutoff the flow of lubricant into the wedge and to prevent replenishment of the lubricant flowing out of the wedge, thus severely limiting the load carrying capacity of the bearing.

FIG. 2 shows the principal of operation of the bearing of this invention. In this illustration the same symbols are used to designate corresponding parts of the illustration. In this figure there is added the feature that the pad is composed of two parts 11$a$ and 11$b$ which meet in an arcuate interface, faces 15, and 16, with the center of the arc at a point 17 on a line extending in the direction of the member 13, away from the member 11$a$. As illustrated, the center of curvature point is on a line perpendicular to the rest position of the pad 11 and at the center of the pad. The arcuate interface may be cylindrical or spherical, depending on the application of the bearing. As shown by FIG. 2, the moments of the load pressure forces and the friction forces are in the opposite direction. The distance along the line is a function of the desired curvature which is selected to establish the position of the pad at which an equilibrium condition exists between the moments due to the load force and the moments due to the viscus friction forces of the lubricant. In this discussion it is assumed that there are no friction forces generated at the interface between pad elements 11$a$ and 11$b$. Under these conditions, the face 11$a$ of the pads of the bearing, such as the one illustrated, will be swung to the dotted line position thus forming a wedge with the end opened to receive the lubricant pumped by the motion of element 13. The swing motion of pad 11$a$, as illustrated, includes a component of motion parallel to and in the direction of motion of member 13, and a rotational component about an axis extending into the plane of the drawings of FIGS. 2 and 3, this being referred to, for convenience, as an axis extending laterally transversely of the direction of movement of member 13. Stated differently, the axis of swinging motion of face pad 11a intersects point 17 and extends generally into the plane of the drawings of FIGS. 2 and 3, although this is not to say that the total resultant motion of pad face 11a will always precisely constitute a swinging motion about this axis. Actually, particularly when an elastomer-inelastic interface is used as shown in FIGS. 3, 4 and 6, described below, the inclination of the plane including the surface of the pad face 11a when the face has swing to a wedge-gap producing position may possibly be slightly different than absolutely normal to a radius extending between point 17 and the surface of the face pad, although the absolute total motion of face 11a under all conditions of speed and load is not precisely known at this time. To the best of applicant's knowledge, the pad face 11a swings to a stable position, as illustrated, in response to load and friction forces, to form a wedge-shaped gap converging in the direction of motion of the movable member 13. The swinging motion of the face 11a ensures the formation of the wedge-gap, and the means described herein for supporting the face 11a permits the latter to seek an equilibrium balanced position for an extremely wide range of load and speed conditions. The magnitude of the viscus friction forces are inversely proportional to the magnitude of the gap between the pad face 11a and member 13. In addition, the magnitude of the gap is inversely proportional to the magnitude of the load force. Thus the greater the load force trying to close the gap the greater will be the friction forces generated to balance the load force. Therefore the pad selfadjusts to produce a wedge in which the replenishment lubricant can never be cutoff regardless of the magnitude of the load force. As the replenishment lubricant will always be maintained, the load capacity is extremely high. The maintenance of a converging wedge under all load conditions prevents the "stick-slip" condition from occurring.

Even in the start up condition the friction forces act to counter the effects of the load forces on the bearing pad regardless of which of the two directions, clockwise or counterclockwise, the member 13 moves.

Figure 1:
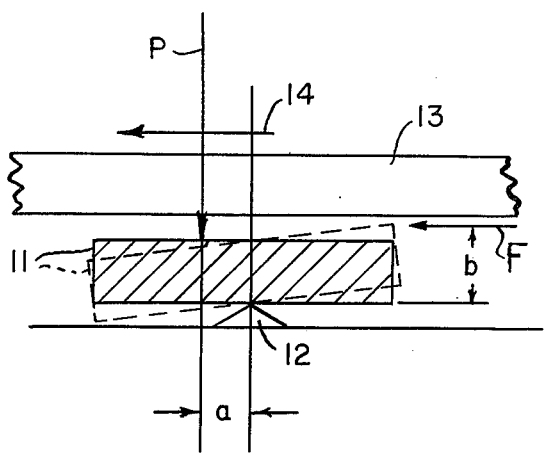
FIG. 1 is a simplified sketch of a portion of a pivoted pad thrust bearing showing the effects of pressure and friction forces on the bearing pad.
Figure 3:
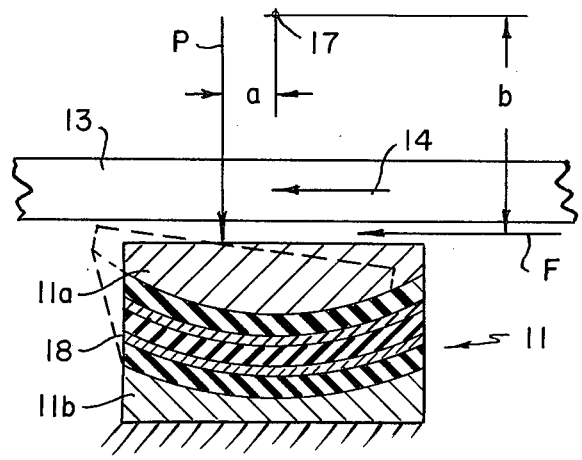
FIG. 3 illustrates a portion of a bearing utilizing a thrust pad constructed according to this invention.
Figure 2:
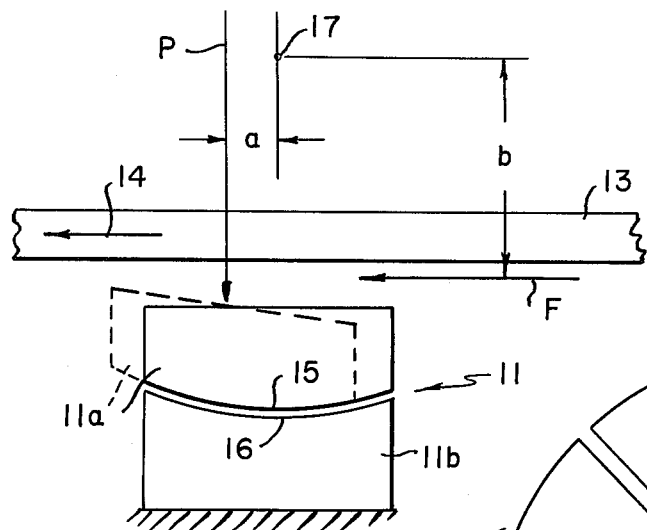
FIG. 2 is a simplified sketch of a portion of a bearing showing the pad elements of the thrust version of the present invention and the effects of pressure and friction forces on the bearing pad.

Referring to FIG. 3 there is shown a preferred embodiment of the invention in which the face 11a of the pad 11 is bonded to a section of an metal-elastomer laminates 18 which is in turn is bonded to the base 11b of the pad 11. Each of the other pads required to make up the bearing are of similar construction and function similarly. In this case the metal-elastomer laminate functions for substantially frictionless movement in the direction of movement of member 13, while due to its inherent stiffness, it will substantially not deflect in the direction of the load pressure. It should be noted that bearing pads of this construction can self adjust to either direction of movement of the element 13. Another function accomplished by the laminated construction of the pad is that of equalizing the load between adjacent pads as load shifts under different conditions i.e. speed, thrust etc.

Figure 4:
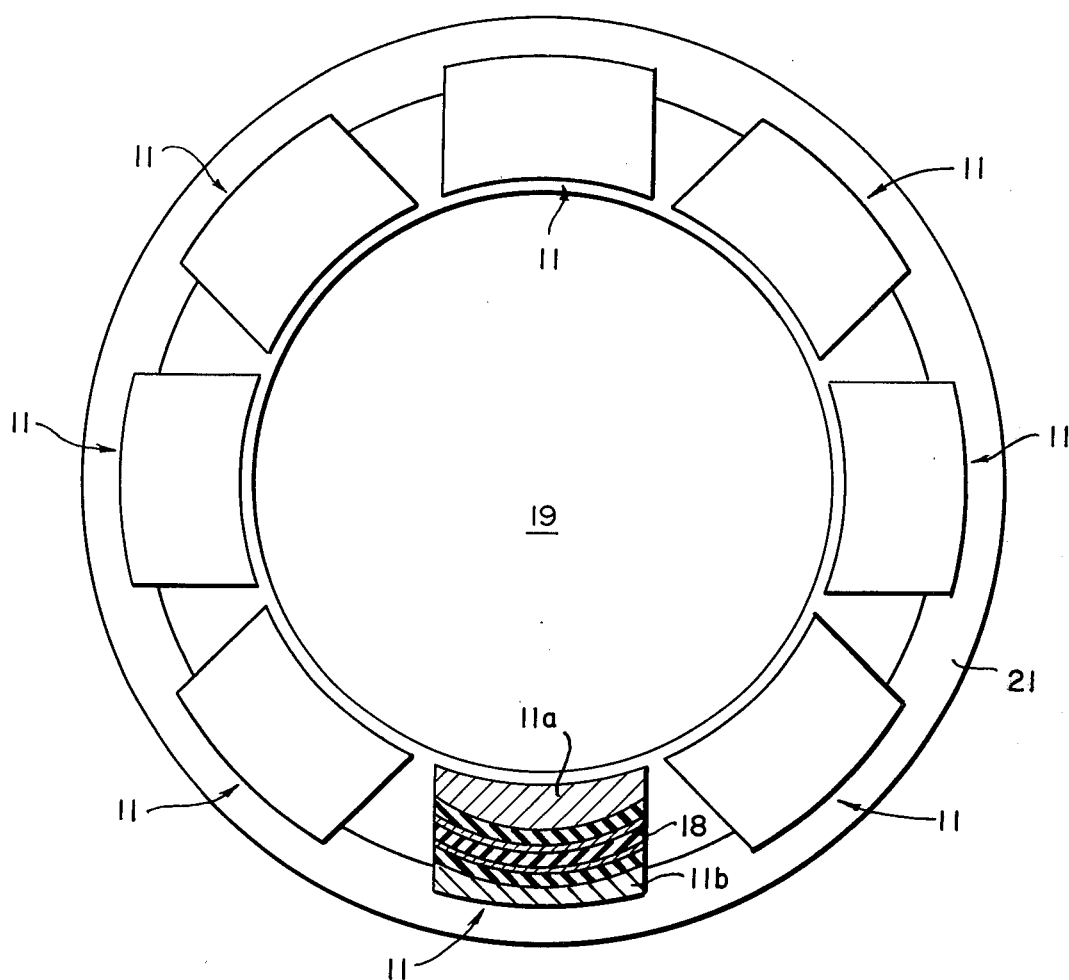
FIG. 4 illustrates the present invention applied to a cylindrical bearing.

FIG. 4 illustrates the application of the invention to a cylindrical bearing in which each of the pads 11 is similar to the pad of FIG. 3. Element 19 is the shaft and element 21 is the bearing housing.

Figure 5:
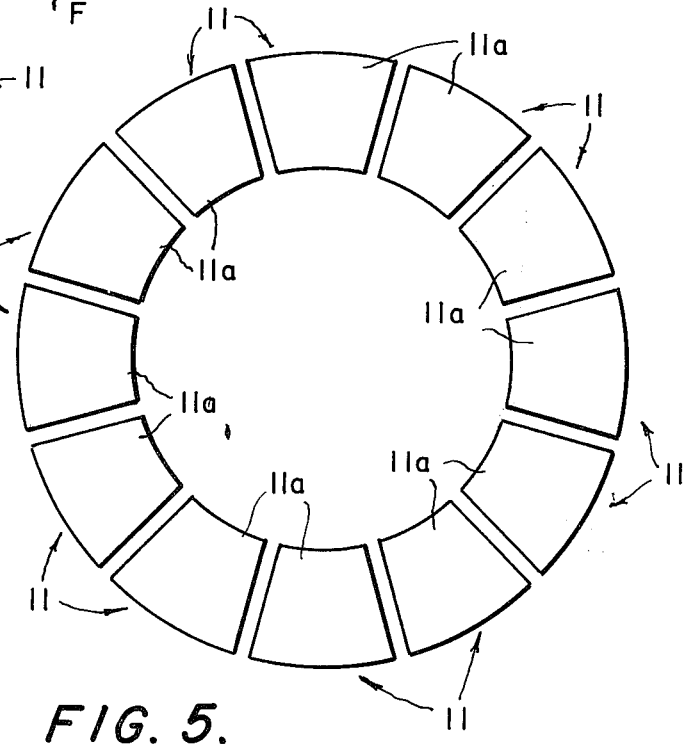
FIG. 5 illustrates the present invention applied to a flat thrust type bearing.

FIG. 5 shows the application of this invention to a thrust bearing wherein each of the pads 11 are of the type shown in FIG. 3.

Figure 6:
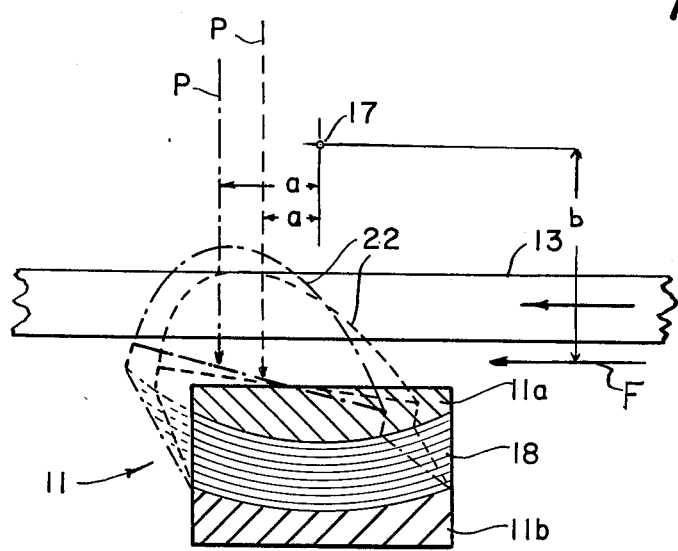
FIG. 6 is a diagram showing fluid pressure distribution on the face of the pad.

FIG. 6 indicates in a generalized way the fluid pressure distribution between the pad face 11a and the member 13.

It is also to be understood that the material for the face of pad 11 is selected to be compatable with the selected lubricant and on the basis of other factors well known in the art.

Obviously many modifications and variations of the present invention are possible in the light of the above teachings. It is therefore to be understood that within the scope of the appended claims the invention may be practiced otherwise than as specifically described.

What is claimed is:

1. A bearing having opposing relatively moving members including:
   a plurality of pads mounted on one of said relatively moving members and interposed between said members;
   each of said pads having a face portion and a base portion;
   a fluid lubricant in contact with the bearing pads and said relatively moving members;
   means responsive to the relative movement of the members to cause the face portion of each of said pads to swing in the direction of motion of the other of said members about a center of rotation positioned outside said pad in the direction of said other member.

2. A bearing as claimed in claim 1 in which said pad comprises:
   a face member;
   a base member, with an arcuate low friction interface between said base and said face members;
   said interface having its center of curvature outside of the pad and in the direction of the other of said opposing members.

3. A bearing as claimed in claim 1 in which said means includes a metal-elastomer laminate bonded to said face portion on one side and to the base portion on the other side.

4. A bearing having opposing stationary and moving members including:
   a plurality of load bearing pads interposed between said moving and said stationary member;
   each of said pads having a face portion and a base portion;
   a fluid in contact with the load bearing pads and the moving member;
   means to cause the face of each of said pads to swing in the direction of motion of the moving member when under load, said means including a metal-elastomer laminate bonded to said face portion on one side and to the base portion on the other side, said metal-elastomer laminate having arcuate lamina with the center of curvature of the arc lying outside of said pad and in the direction of the opposing member.

5. A bearing as claimed in claim 4 in which the moment of the load force is equal and opposite to the moment of the friction forces under operating conditions.

6. A bearing as claimed in claim 4 in which said metal-elastomer laminate provides for load equalization between the load bearing pads.

7. A hydrodynamic bearing pad for supporting a relatively movable member in low-friction relationship through a lubricating fluid medium, said pad comprising a swingable face portion disposed adjacent said movable member, and means for supporting said face portion for swinging motion about a center of rotation disposed in a direction towards said movable member and away from said face portion, said swinging motion including a component of motion parallel to and in the direction of motion of said relatively movable member and a component along the perpendicular through the center of rotation to cause a swinging movement of said face portion about said center of rotation.

8. The hydrodynamic bearing pad recited in claim 7, wherein said means for supporting said face portion for swinging motion comprises a relatively stationary base element, the said face portion and base element intersecting along an arcuate interface, the center of curvature of said arcuate interface lying in the direction of said movable member and away from said face portion, said interface comprising a relatively low-friction joint between said face portion and said base element in a direction parallel to said arcuate interface.

9. The hydrodynamic bearing pad recited in claim 7, wherein said means for supporting said face portion for swinging motion comprises a relatively stationary base element, the said face portion and base element being joined together along an arcuate interface by an elastomeric material that is relatively rigid in a radial direction with respect to said arcuate interface, and is relatively yielding in a direction parallel to said arcuate interface, the center of curvature of said arcuate interface lying in the direction of said movable member and away from said face member.

10. The hydrodynamic bearing pad recited in claim 9, wherein said elastomeric material is a composite elastomer-inelastic laminate.

11. A hydrodynamic bearing arrangement for supporting a movable load applying member in low-friction relationship through a lubricating fluid medium, said bearing arrangement comprising a plurality of bearing pads between said movable load applying member and a relatively stationary support structure, each bearing pad including a swingable face portion disposed adjacent said movable member, and means for supporting said face portion for swinging motion about a center of rotation disposed in a direction towards said movable member and away from said face portion, said swinging motion including a component of motion parallel to the direction of motion of said relatively movable member and a rotational component about an axis extending laterally transversely of said direction of motion, said face portion of each pad being swingable to a dynamically stable inclined position under the combined influences of friction and load forces acting thereon to produce a hydrodynamic lubricant wedge-shaped gap between said movable member and face portion, said gap covering in the direction of motion of said movable member.

12. The hydrodynamic bearing arrangement recited in claim 11, wherein said means for supporting each face portion of each of said pads comprises a relatively stationary base element, each face portion and base element intersecting along an arcuate interface, the center of curvation of said arcuate interface lying in a direction towards said movable member and away from said face portion, said interface comprising a relatively low-friction joint between said face portion and said base element.

13. The hydrodynamic bearing arrangement recited in claim 11, wherein said means for supporting each face portion of each of said pads comprises a relatively stationary base element, each face portion and base element being joined together along a arcuate interface by an elastomeric material that is relatively rigid in a radial direction with respect to said arcuate interface, and is relatively yielding in a direction parallel to said arcuate interface, the center of curvature of said arcuate interface lying in a direction towards said movable member and away from each of said face portions.

14. The hydrodynamic bearing arrangement recited in claim 13, wherein said elastomeric material is a composite elastomer-inelastic laminate.

15. The hydrodynamic bearing arrangement recited in claim 13, wherein said elastomeric material is slightly yieldable in a radial direction with respect to said arcuate interface to provide for load equalization between said bearing pads and to accommodate minor angular displacements of said face portions relative to said base portions.

16. A hydrodynamic bearing pad for supporting a relatively movable load applying member in low-friction relationship through a lubricating fluid medium, said pad comprising a face portion disposed adjacent said movable member, means supporting said pad for swinging motion about an axis of swinging motion positioned outside said face portion and towards said movable member, said swinging motion occurring in response to friction and load forces resulting from relative motion between said movable member and said face portion of said pad to produce a hydrodynamic lubricant wedge-shaped gap between said movable member and said face portion, said gap converging in the direction of motion of said movable member.

* * * * *